United States Patent
Yamano et al.

(10) Patent No.: US 7,301,670 B2
(45) Date of Patent: Nov. 27, 2007

(54) MEDICAL IMAGE RECORDING SYSTEM

(75) Inventors: Akira Yamano, Hino (JP); Masayuki Nakazawa, Hachioji (JP)

(73) Assignee: Konica Corporation, Tokyo (JP)

( * ) Notice: Subject to any disclaimer, the term of this patent is extended or adjusted under 35 U.S.C. 154(b) by 1007 days.

(21) Appl. No.: 10/368,662

(22) Filed: Feb. 19, 2003

(65) Prior Publication Data

US 2003/0160834 A1 Aug. 28, 2003

(30) Foreign Application Priority Data

Feb. 26, 2002 (JP) ............... 2002-049759

(51) Int. Cl.
*H04N 1/40* (2006.01)
(52) U.S. Cl. ........................ 358/1.9; 382/274
(58) Field of Classification Search ............... 358/1.9, 358/2.1, 502; 382/254, 274
See application file for complete search history.

(56) References Cited

U.S. PATENT DOCUMENTS

| | | | | |
|---|---|---|---|---|
| 6,633,657 | B1 * | 10/2003 | Kump et al. | 382/128 |
| 6,782,137 | B1 * | 8/2004 | Avinash | 382/254 |
| 6,834,125 | B2 * | 12/2004 | Woodell et al. | 382/274 |
| 7,002,533 | B2 * | 2/2006 | Sayag | 345/7 |

FOREIGN PATENT DOCUMENTS

| | | |
|---|---|---|
| JP | 55-087953 | 7/1980 |
| JP | 55-163472 | 12/1980 |
| JP | 62-62373 | 12/1987 |
| JP | 62-62376 | 12/1987 |
| JP | 03-222577 | 10/1991 |
| JP | 07-276789 | 10/1995 |
| JP | 09-254521 | 9/1997 |
| JP | 10-075395 | 3/1998 |
| JP | 10-076751 | 3/1998 |
| JP | 10-202920 | 8/1998 |
| JP | 2000-129182 A | 5/2000 |

* cited by examiner

*Primary Examiner*—Thomas D. Lee
*Assistant Examiner*—Stephen Brinich
(74) *Attorney, Agent, or Firm*—Frishauf, Holtz, Goodman & Chick, P.C.

(57) ABSTRACT

There is described a medical image recording system for recording an image on a reflex-type recording medium based on image information, and a medical image recording system for recording with ink-jet the medical image information obtained through an input device, such as a medical photographing device. The system includes an image-processing section to apply a dynamic-range compression processing to original image signals representing the medical image and inputted therein, in order to generate output image signals, and an image-forming section to form a compressed medical image on the reflex-type recording medium, based on the output image signals generated by the image-processing section. The dynamic-range compression processing is to compress a dynamic-range of density variation to be expressed on the reflex-type recording medium.

25 Claims, 7 Drawing Sheets

MEDICAL IMAGE RECORDING SYSTEM

BACKGROUND OF THE INVENTION

The present invention relates to a medical image recording system for recording an image on a recording medium based on image information and, more exactly, to a medical image recording system for recording with ink-jet the medical image information obtained through an input device, such as a medical photographing device.

These years, there have been invented methods of obtaining medical radiographic information without using a radiographic film made of silver-salt photosensitive material. For example, computed radiography (CR) has become popular; it is a device for reading radiographic images, in which a radiographic image, once stored on an imaging plate comprising mostly of accelerated phosphor, is taken out as an accelerated emission light, using an excitation light, and then the light is photoelectrically transferred into an image signal.

Of late, there has been proposed a device called flat panel detector (FPD) that reads out radiographic information using radiation phosphor or radiation photo-conductive substance combined with a two-dimensional semiconductor detector such as a TFT switching device.

Besides, other radiographic image input devices better than simple radiography, for example, X-ray computer tomography unit (X-ray CT unit) and magnetic resonance image generator (MRI generator) have also come into wider use. Most of these medical image input devices provide the image information in the form of digital signals. A method most frequently employed for diagnosing these medical images is to record the image information on a transparent-type recording medium and/or reflex-type recording medium and observe the image in the form of a hard copy.

A recording method most frequently applied to a medical image recording device for recording the medical image information on a recording medium is to record an image on a transparent-type recording medium, made of silver-salt recording material, by laser exposure. With this method, monochrome multi-gradation image can be depicted with excellent gradient and besides, recording the image on a transmission medium and observing it with a transmission light enables to achieve high diagnostic resolution.

Besides, very recently, hopes are laid on a possibility of recording medical images using an ink-jet type recording device.

Conventionally, in most cases, while images used for diagnosis are recorded on transparent-type recording medium and observed with transmission light, images recorded on reflex-type recording medium are put on a clinical chart or used for explanation to a patient, that is, the images are recorded for reference purpose. These years, however, there have been increasing needs of using the reflection images in diagnosis because of the convenience.

Besides, even when used for reference purpose, there is a need that the image makes a similar appearance to a transmission image used actually for diagnosis.

Even if an image is recorded on a reflex-type recording medium in the same way as on a transparent-type recording medium, however, a reflection image does not have the same appearance as an transmission image because of higher density. If this difference is taken into account and suitable gradation processing is employed depending upon the type of the recording medium, the above problem can be solved to some extent.

That is, a solution is to process the images so that the reflection density and transmission density become approximately equal. Besides, as disclosed in the Japanese Application Patent Laid-open Publication No. HEI 10-202920 (1998), instead of performing different gradation processing depending upon the type of the recording medium, selecting the combinations of different ink densities can result in the same effect as produced in performing different gradation processing.

However, a satisfactory effect cannot be produced simply with the above method. Since a transmission image is observed in a transmitted state, using high-intensity light source, an influence of the light that reflects on the surface of the recording medium and comes into the observer's eyes is very small (See FIG. 7($a$) and FIG. 7($c$)). In addition, if lights are turned off in the room for observation, no reflected light is caused and only the optical density based on the optical absorption of colors can be observed.

A reflex-type recording medium, on the other hand, has some glossiness, much or less, on the surface and, even if sufficient amount of color is put on the recording medium, the density obtained from it is lower than the optical density based on the optical absorption because there exists reflected light of a light irradiated for observation (See FIG. 7($b$) and FIG. 7($d$)).

For the above reason, it is impossible to make the reflection density of a reflected image similar to the transmission density of a transmitted image in the high density range of the image. In addition, deterioration of sharpness on a reflex-type recording medium is more significant than on a transparent-type recording medium because the extent of light scattering inside the recording medium is greater, but this difference in the sharpness cannot be corrected even by different gradation processing. In other words, as shown in FIG. 7($e$), the reflected image density (<1>) can be corrected to <2> or <3> but not to the transmitted image density (<4>) throughout the whole density range because of the highest reproducible density limit. Even if corrected to <2> to <3>, it is inevitable that the contrast in the high density range becomes lower or insufficient.

SUMMARY OF THE INVENTION

To overcome the abovementioned drawbacks in conventional medical image recording systems, it is an object of the present invention to provide a medical image recording system capable of recording an image, even though recorded on a reflex-type recording medium, that is as applicable to diagnosis as a transmission image.

According to the present invention, when a medical image is recorded on a reflex-type recording medium based on the image signal representing the medical image, the dynamic range compression processing is performed on the inputted image signal, and hence an image, even though recorded on a reflex-type recording medium, that is as applicable to diagnosis as a transmission image is recorded.

Accordingly, to overcome the cited shortcomings, the abovementioned object of the present invention can be attained by image-recording apparatus described as follow.

(1) A system for recording a medical image on a reflex-type recording medium, the system comprising: an image-processing section to apply a dynamic-range compression processing to original image signals representing the medical image and inputted therein, in order to generate output image signals; and an image-forming section to form a compressed medical image on the reflex-type recording medium, based on the output image signals generated by the image-processing section; wherein the dynamic-range compression processing is to compress a dynamic-range of density variation to be expressed on the reflex-type recording medium.

(2) The system of item 1, wherein the image-processing section applies the dynamic-range compression processing to the original image signals so as to compress the dynamic-range of the density variation in at least a high density range.

(3) The system of item 1, wherein, in addition to the dynamic-range compression processing, the image-processing section applies a frequency enhancement processing to the original image signals.

(4) The system of item 3, wherein, in the frequency enhancement processing, the lower an image density is, the larger a value of a modulation transfer function in respect to an image-processing at 2.0 cycles/mm is applied.

(5) The system of item 4, wherein the image-processing section performs the frequency enhancement processing based on an equation of, $$Sproc=Sorg+\beta(Sorg-Sus),$$

where Sproc represents output image signals outputted from the image-processing section, Sorg represents original image signals inputted into the image-processing section, Sus represents unsharp image signals generated by applying an unsharp-mask processing to the original image signals, and β represents an emphasizing coefficient; and wherein at least one of the emphasizing coefficient β and a size of a mask, employed for the unsharp-mask processing, monotonously decreases with an increase of image density.

(6) The system of item 3, wherein said frequency enhancement processing is performed by using a multi-resolution image processing method, which employs a plurality of unsharp image signals having modulation transfer functions being different each other with respect to an unsharp-mask processing.

(7) The system of item 1, wherein the image-forming section comprises: an ink-jet printer having an ink-jetting head that emits ink particles from plural kinds of inks, densities of which are different relative to each other while colors of which are substantially the same, so as to form an output medical image on the reflex-type recording medium, based on the output image signals generated by the image-processing section.

(8) The system of item 7, wherein the image-forming section further comprises: an ink-combination selecting section to select a combination of inks, to be employed for an ink-jet printing operation corresponding to a kind of the reflex-type recording medium, out of the plural kinds of inks; and a controlling section to control the ink-jet printing operation, for which the combination of inks selected by the ink-combination selecting section is employed, based on the output image signals generated by the image-processing section.

(9) A system for recording a medical image on a recording medium, the system comprising: an image-processing section to apply at least one of a dynamic-range compression processing and a frequency enhancement processing to original image signals representing the medical image and inputted therein, in order to generate output image signals; an image-processing condition selecting section to select an image-processing condition to be applied out of plural conditions being different each other, corresponding to a type of the recording medium employed for recording the medical image; and a controlling section to control the image-processing section so as to perform an image-processing operation based on the image-processing condition selected by the image-processing condition selecting section.

(10) The system of item 9, wherein the recording medium includes a reflex-type recording medium; and wherein a spectral reflection factor of light, diffusedly reflected from the reflex-type recording medium in a wavelength range of 460 nm-640 nm, is equal to or greater than 70%.

(11) The system of item 9, wherein, in case of performing the frequency enhancement processing, the image-processing condition selecting section selects such an image-processing condition that a value of a modulation transfer function, in regard to an image-processing at 2.0 cycles/mm in an image-processing condition for recording onto a reflex-type recording medium, is greater than another value of a modulation transfer function, in regard to an image-processing at 2.0 cycles/mm in an image-processing condition of recording onto a transparent-type recording medium.

(12) The system of item 11, wherein the image-processing condition selecting section selects such an image-processing condition that a value of a modulation transfer function, in regard to an image-processing at 2.0 cycles/mm in an image-processing condition for recording onto the reflex-type recording medium, is equal to or greater than 1.5 times of another value of a modulation transfer function, in regard to an image-processing at 2.0 cycles/mm in an image-processing condition of recording onto the transparent-type recording medium.

(13) The system of item 11, wherein the image-processing section performs the frequency enhancement processing based on an equation of, $$Sproc=Sorg+\beta(Sorg-Sus),$$

where Sproc represents output image signals outputted from the image-processing section, Sorg represents original image signals inputted into the image-processing section, Sus represents unsharp image signals generated by applying an unsharp-mask processing to the original image signals, and β represents an emphasizing coefficient; and wherein at least one of the emphasizing coefficient β and a size of a mask, employed for the unsharp-mask processing when recording onto the reflex-type recording medium, is greater than that employed for the unsharp-mask processing when recording onto the transparent-type recording medium.

(14) The system of item 11, wherein the frequency enhancement processing is a multi-resolution image enhancement processing, which employs plural unsharp image signals having different modulation transfer functions in regard to an unsharp image-processing.

(15) The system of item 11, wherein a transmission diffused density of the transparent-type recording medium is equal to or lower than 0.4.

(16) The system of item 15, wherein the transparent-type recording medium comprises a substrate which consists of a transparent PET including a blue dye.

(17) The system of item 9, wherein, in the frequency enhancement processing when recording onto a reflex-type recording medium, the lower an image density is, the higher a emphasizing degree of the frequency enhancement processing is.

(18) The system of item 17, wherein the image-processing section performs the frequency enhancement processing based on an equation of, $$Sproc = Sorg + \beta(Sorg - Sus),$$

where Sproc represents output image signals outputted from the image-processing section, Sorg represents original image signals inputted into the image-processing section, Sus represents unsharp image signals generated by applying an unsharp-mask processing to the original image signals, and β represents an emphasizing coefficient; and wherein at least one of the emphasizing coefficient β and a size of a mask, employed for the unsharp-mask processing, monotonously decreases with an increase of the image density.

(19) The system of item 9, wherein, in case of performing the dynamic-range compression processing, the image-processing condition selecting section selects such an image-processing condition that a compression degree when recording onto a reflex-type recording medium is higher than that when recording onto a transparent-type recording medium.

(20) The system of item 9, wherein, in case of performing the dynamic-range compression processing, the image-processing condition selecting section selects such an image-processing condition that a compression degree in a high density range when recording onto a reflex-type recording medium is higher than that when recording onto a transparent-type recording medium.

(21) The system of item 9, wherein, in case of performing the dynamic-range compression processing, the image-processing condition selecting section selects such an image-processing condition that the dynamic-range compression processing is performed only in a low density range when recording onto a transparent-type recording medium, while the dynamic-range compression processing is performed in both the low density range and a high density range when recording onto a reflex-type recording medium.

(22) The system of item 9, further comprising: an ink-jet printer having an ink-jetting head that emits ink particles from plural kinds of inks, densities of which are different relative to each other while colors of which are substantially the same, so as to form an output medical image on the recording medium, based on the output image signals generated by the image-processing section.

(23) The system of item 9, further comprising: an ink-jet printer having an ink-jetting head that emits ink particles from plural kinds of inks, densities of which are different relative to each other while colors of which are substantially the same; an ink-combination selecting section to select a combination of inks, to be employed for an inkjet printing operation corresponding to a type of the recording medium, out of the plural kinds of inks; and a controlling section to control the ink-jet printing operation, for which the combination of inks selected by the ink-combination selecting section is employed, so that the ink-jet printer forms an output medical image on the recording medium, based on the output image signals generated by the image-processing section.

(24) The system of item 1, wherein a spectral reflection factor of light, diffusedly reflected from the reflex-type recording medium in a wavelength range of 460 nm-640 nm, is equal to or greater than 70%.

(25) The system of item 24, wherein the reflex-type recording medium comprises a substrate, which includes a white PET.

(26) The system of item 11, wherein the reflex-type recording medium comprises a substrate, which includes a white PET.

Further, to overcome the abovementioned problems, other medical image recording systems, embodied in the present invention, will be described as follow: (27) A medical image recording system for recording a medical image on a reflex-type recording medium based on the image signal representing the medical image, characterized in that the medical image recording system includes an image processing means for performing dynamic range compression processing on the inputted image signal.

According to the present invention described in the above, when a medical image is recorded on a reflex-type recording medium, the dynamic range compression processing is performed on the inputted image signal.

Because the dynamic range compression processing is performed beforehand in the image processing stage before recording the image, it becomes possible to record an image, even though recorded on a reflex-type recording medium, that is as applicable to diagnosis as a transmission image.

(28) The medical image recording system according to item 27, characterized in that the image processing means performs the dynamic range compression processing for compressing the dynamic range of the high density range.

According to the present invention described in the above, because the dynamic range of particularly high density range is compressed, signals in the high density range, of which contrast becomes insufficient on a reflection image, shift to relatively low density side and therefore sufficient contrast can be kept, and hence it becomes possible to record an image, even though recorded on a reflex-type recording medium, that is as applicable to diagnosis as a transmission image.

(29) The medical image recording system according to either item 27 or 28, characterized in that the image processing means performs frequency enhancement processing in addition to the dynamic range compression processing.

According to the present invention described in the above, because both dynamic range compression processing on particularly high density range and frequency enhancement processing are employed, not only the deficiency of contrast in the high density range can be eliminated but the deterioration of sharpness due to light scattering inside the recording medium can be recovered, and hence it becomes possible to record an image, even though recorded on a reflex-type recording medium, that is as applicable to diagnosis as a transmission image.

(30) The medical image recording system according to item 29, characterized in that the medical image recording system performs the frequency enhancement processing, in which the modulation transfer function relevant to the image processing at 2.0 cycle/mm has a greater value as the image density becomes lower.

According to the present invention described in the above, because both dynamic range compression processing on particularly high density range and frequency enhancement processing are employed, and also because the exaggeration by the frequency enhancement processing is increased in the low density range, the sharpness in the low density range, where the sharpness deteriorates heavily because of lower optical absorption of color and higher light scattering inside the recording medium, can be recovered, and hence it becomes possible to record an image, even though recorded on a reflex-type recording medium, that is as applicable to diagnosis as a transmission image.

(31) The medical image recording system according to item 30, characterized in that the frequency enhancement processing is performed based on a formula Sout=Sorg+β (Sorg−Sus), (where Sout: image signal after the processing, Sorg: image signal before the frequency enhancement processing, Sus: unsharp image signal obtained through the unsharp masking processing of the image signal before being subjected to the frequency enhancement processing, and β: exaggeration factor) and at least either one of the exaggeration factor β or mask size in the unsharp masking processing decreases monotonously as the image density increases.

According to the present invention described in the above, because both dynamic range compression processing on particularly high density range and frequency enhancement processing are employed and the exaggeration by the frequency enhancement processing is increased in the low density range, and also because at least either one of the exaggeration factor β or mask size in the unsharp masking processing decreases monotonously as the image density increases, it becomes possible to realize the invention in (4) above in less computation time and with simple construction.

(32) The medical image recording system according to either item 29 or 30, characterized in that the frequency enhancement processing is a multi-resolution image exaggeration processing that employs multiple unsharp image signals having different modulation transfer functions relevant to unsharp masking processing.

According to the present invention described in the above, because the multi-resolution image exaggeration processing is performed on the inputted image signal, deterioration of sharpness can be recovered sufficiently while generation of artifact is prevented, and hence it becomes possible to record an image, even though recorded on a reflex-type recording medium, that is as applicable to diagnosis as a transmission image.

(33) The medical image recording system according to any one of items 27 through 32, characterized in that the medical image recording system comprises an ink-jet recording means that records using multiple ink-jet heads, capable of emitting multiple inks of a same group but with different density from each other, and records an image with ink-jet based on the image signal obtained through the processing by the image processing means.

According to the present invention described in the above, because the above processing is performed at the time when the system records an image using multiple ink-jet heads, capable of emitting multiple inks of a same group but with different density from each other, it becomes possible to record an image, even though recorded with ink-jet on a reflex-type recording medium, that is as applicable to diagnosis as a transmission image.

(34) The medical image recording system according to item 33, characterized in that the medical image recording system comprises an ink selecting means for selecting the combinations of inks to be used for recording out of the multiple inks of a same group, depending upon the type of recording medium to be used for recording, and a control means for controlling the system so as to record an image with ink-jet, using the combinations of the inks selected by the ink selecting means, based on the image signal obtained through the processing by the image processing means.

According to the present invention described in the above, because multiple ink-jet heads are selected depending upon the type of recording medium, multiple combinations of inks are selected for recording, and the inks to be selected can be so determined that the image density produced on the recording medium keeps a specified linear relationship with the image signal, and hence it becomes possible to record an image always with excellent gradation even in case the recording media is changed to a different one without adding any processing to the image signal.

(35) A medical image recording system for recording a medical image on a recording medium based on the image signal representing the medical image, characterized in that the medical image recording system comprises an image processing means for performing at least either one of dynamic range compression processing or frequency enhancement processing on the inputted image signal, an image processing condition selecting means for selecting an image processing condition to apply out of multiple different image processing conditions, depending upon the type of recording medium to be used for recording, and a control means for controlling the image processing means so as to perform image processing based on the image processing condition selected by the image processing condition selecting means.

According to the present invention described in the above, when a medical image is recorded on a reflex-type recording medium, either one of the dynamic range compression processing or frequency enhancement processing is performed on the inputted image signal, depending upon the type of recording medium to be used for recording, and an image processing condition to apply is selected out of multiple different image processing conditions, depending upon the type of recording medium to be used for recording.

As explained above, because the system performs either one of the dynamic range compression processing or frequency enhancement processing and selects an image processing condition to apply out of multiple different image processing conditions, depending upon the type of recording medium to be used for recording, it becomes possible to record an image, either to be recorded on a reflex-type recording medium or on a transmission image, that is applicable similarly to diagnosis.

(36) The medical image recording system according to item 35, characterized in that, the image processing condition selecting means is so set to select the image processing condition so that, when the image processing means performs the frequency enhancement processing, the modulation transfer function relevant to the image processing at 2.0 cycle/mm under the image processing condition for recording on a reflection medium has a greater value than the modulation transfer function relevant to the image processing at 2.0 cycle/mm under the image processing condition for recording on a transmission medium.

According to the present invention described in the above, the image processing condition selecting means sets the system so that, when the frequency enhancement processing is performed, the modulation transfer function relevant to the image processing at 2.0 cycle/mm under the image processing condition for recording on a reflection medium has a greater value than the modulation transfer function relevant to the image processing at 2.0 cycle/mm under the image processing condition for recording on a transmission medium. Because of this, more of the sharpness of an image recorded on a reflex-type recording medium where the sharpness deteriorates heavily because of light scattering inside the recording medium can be recovered, and hence it becomes possible to record an image, either to be recorded on a reflex-type recording medium or on a transmission image, that is applicable similarly to diagnosis.

(37) The medical image recording system according to item 35, characterized in that the image processing condition selecting means is so set to select the image processing condition so that, when the image processing means performs the frequency enhancement processing, the modulation transfer function relevant to the image processing at 2.0 cycle/mm under the image processing condition for recording on a reflection medium has a value of 1.5 times or more as great as the modulation transfer function relevant to the image processing at 2.0 cycle/mm under the image processing condition for recording on a transmission medium.

According to the present invention described in the above, because the modulation transfer function relevant to the image processing at 2.0 cycle/mm under the image processing condition for recording on a reflection medium has a value of 1.5 times or more as great as that for recording on a transmission medium, it becomes possible to further minimize the difference in the sharpness at the frequencies that are important for diagnosing the images recorded on a reflection medium and those recorded on a transmission medium.

(38) The medical image recording system according to item 37, characterized in that the frequency enhancement processing is performed based on a formula Sout=Sorg+β (Sorg−Sus), (where Sout: image signal after the processing, Sorg: image signal before the frequency enhancement processing, Sus: unsharp image signal obtained through the unsharp masking processing of the image signal before being subjected to the frequency enhancement processing, and β: exaggeration factor) and at least either one of the exaggeration factor β or mask size in the unsharp masking processing is greater in case of recording on a reflex-type recording medium than in case of recording on a transparent-type recording medium.

According to the present invention described in the above, because the modulation transfer function relevant to the image processing at 2.0 cycle/mm under the image processing condition for recording on a reflection medium has a value of 1.5 times or more as great as that for recording on a transmission medium, and also because at least either one of the exaggeration factor β or mask size in the unsharp masking processing decreases monotonously as the image density increases, it becomes possible to realize the invention in (37) above in less computation time and with simple construction.

(39) The medical image recording system according to any one of items 35 to 38, characterized in that more intense exaggeration is employed in the frequency enhancement processing on images to be recorded on a reflex-type recording medium if the image density is lower.

According to the present invention described in the above, because the exaggeration by the frequency enhancement processing is increased in the low density range, the sharpness in the low density range, where the sharpness deteriorates heavily because of lower optical absorption of color and higher light scattering inside the recording medium, can be recovered, it becomes possible to further minimize the difference in the sharpness at the frequencies that are important for diagnosing the images recorded on a reflection medium and those recorded on a transmission medium.

(40) The medical image recording system according to item 39, characterized in that the frequency enhancement processing is performed based on a formula Sout=Sorg+β (Sorg−Sus), (where Sout: image signal after the processing, Sorg: image signal before the frequency enhancement processing, Sus: unsharp image signal obtained through the unsharp masking processing of the image signal before being subjected to the frequency enhancement processing, and β: exaggeration factor) and at least either one of the exaggeration factor β or mask size in the unsharp masking processing decreases monotonously as the image density increases, According to the present invention described in the above, because the exaggeration by the frequency enhancement processing is increased in the low density range, and also because at least either one of the exaggeration factor β or mask size in the unsharp masking processing decreases monotonously as the image density increases, it becomes possible to realize the invention in (39) above in less computation time and with simple construction.

(41) The medical image recording system according to item 36 or 37, characterized in that the frequency enhancement processing is a multi-resolution image exaggeration processing that employs multiple unsharp image signals having different modulation transfer functions relevant to unsharp masking processing.

According to the present invention described in the above, because the multi-resolution image exaggeration processing is performed on the inputted image signal, deterioration of sharpness can be recovered sufficiently while generation of artifact is prevented, and hence it becomes possible to record an image, either to be recorded on a reflex-type recording medium or on a transmission image, that is applicable similarly to diagnosis.

(42) The medical image recording system according to item 35, characterized in that the image processing condition selecting means is so set to select the image processing condition so that, when the image processing means performs the dynamic range compression processing, the compression on images to be recorded on a reflex-type recording medium is higher than the compression on images to be recorded on a transparent-type recording medium.

According to the present invention described in the above, because the dynamic range compression on images to be recorded on a reflex-type recording medium is set higher than the compression on images to be recorded on a transparent-type recording medium, the dynamic range of an image recorded on a reflex-type recording medium, of which expressible density range is narrower, can be compressed much narrower, it becomes possible to record an image, either to be recorded on a reflex-type recording medium or on a transmission image, that is applicable similarly to diagnosis.

(43) The medical image recording system according to item 35, characterized in that the image processing condition selecting means is so set to select the image processing condition so that, when the image processing means performs the dynamic range compression processing, the compression on the high density range of images to be recorded on a reflex-type recording medium is higher than the compression on the high density range of images to be recorded on a transparent-type recording medium.

According to the present invention described in the above, because the image processing condition is so set that the compression on the high density range of images to be recorded on a reflex-type recording medium is set higher than the compression on the high density range of images to be recorded on a transparent-type recording medium, the dynamic range of the high density range of an image recorded on a reflex-type recording medium, on which the deterioration of contrast is particularly remarkable, can be compressed much narrower, and hence it becomes possible to record an image, either to be recorded on a reflex-type recording medium or on a transmission image, that is applicable similarly to diagnosis.

(44) The medical image recording system according to item 35, characterized in that the image processing condition selecting means is so set to select the image processing condition so that, when the image processing means performs the dynamic range compression processing, the low density range of images is compressed for recording on a transparent-type recording medium and both low density range and high density range are compressed for recording on a reflex-type recording medium.

According to the present invention described in the above, because the image processing condition is so set that the low density range of images is compressed for recording on a transparent-type recording medium and both low density range and high density range are compressed for recording on a reflex-type recording medium, the dynamic range of the high density range of an image recorded on a reflex-type recording medium, on which the deterioration of contrast is particularly remarkable, can be compressed much narrower and therefore the diagnostic resolution of the low density range, such as on an image on the breast, improves, and hence it becomes possible to record an image, either to be recorded on a reflex-type recording medium or on a transmission image, that is applicable similarly to diagnosis.

(45) The medical image recording system according to any one of the items 35 through 44, characterized in that the medical image recording system comprises an ink-jet recording means that records using multiple ink-jet heads, capable of emitting multiple inks of a same group but with different density from each other, and records an image with ink-jet based on the image signal obtained through the processing by the image processing means.

According to the present invention described in the above, because the above processing is performed at the time when the system records an image using multiple ink-jet heads, capable of emitting multiple inks of a same group but with different density from each other, it becomes possible to record an image, even though recorded with ink-jet on a reflex-type recording medium, that is as applicable to diagnosis as a transmission image.

(46) The medical image recording system according to any one of items 35 through 44, characterized in that the medical image recording system comprises an ink-jet recording means that records using multiple ink-jet heads, capable of emitting multiple inks of a same group but with different density from each other, an ink selecting means for selecting the combinations of inks to be used for recording out of the multiple inks of a same group, depending upon the type of recording medium to be used for recording, and a control means for controlling the system so as to record an image with ink-jet, using the combinations of the inks selected by the ink selecting means, based on the image signal obtained through the processing by the image processing means.

According to the present invention described in the above, because a combination of ink-jet heads is selected depending upon the type of recording medium to be used for recording, the inks to be selected can be so determined that the image density produced on the recording medium keeps a specified linear relationship with the image signal, and hence it becomes possible to record an image always with excellent gradation even in case the recording media is changed to a different one without adding any processing to the image signal.

Besides, the system may be so constructed that the control means for controlling the image processing means so as to perform image processing based on the image processing condition selected by the image processing condition selecting means and the control means for controlling the system so as to record an image with ink-jet, using the combinations of the inks selected by the ink selecting means, based on the image signal obtained through the processing by the image processing means are installed separately or integrated into one control means for controlling both.

(47) The medical image recording system according to any one of items 27 to 46, characterized in that the reflex-type recording medium is such that the spectral reflectance of diffuse reflected light from the recording medium at the wave length of 460 nm to 640 nm is at least 70% or more.

According to the present invention described in the above, because the reflex-type recording medium is such that the spectral reflectance of diffuse reflected light from the recording medium at the wave length of 460 nm to 640 nm is at least 70% or more, sufficient quantity of reflected light can be gained for observing a medical image in a reflected state.

(48) The medical image recording system according to item 47, wherein the reflex-type recording medium comprises the backing made of white PET.

According to the present invention described in the above, because the reflex-type recording medium comprises the backing made of white PET, sufficient quantity of reflected light is gained, and also because the backing has high durability, the medium is suitable for recording a medical image that needs to be stored for a long time.

(49) The medical image recording system according to any one of items 36 to 46, characterized in that the transparent-type recording medium has the transmitted diffusion density of 0.4 or less.

According to the present invention described in the above, because the transparent-type recording medium has the transmitted diffusion density of 0.4 or less, it becomes possible to observe a medical image, when observed in a transmitted state, with sufficient quantity of transmitted light.

(50) The medical image recording system according to item 49, characterized in that the transparent-type recording medium comprises the backing made of transparent PET containing blue dye.

According to the present invention described in the above, because the transparent-type recording medium comprises the backing made of transparent PET containing blue dye, sufficient quantity of transmitted light is gained, and also because the backing has high durability, the medium is suitable for recording a medical image that needs to be stored for a long time.

BRIEF DESCRIPTION OF THE DRAWINGS

Other objects and advantages of the present invention will become apparent upon reading the following detailed description and upon reference to the drawings in which.

DETAILED DESCRIPTION OF THE PREFERRED EMBODIMENT

A preferred embodiment of the present invention is explained hereunder, using figures. The present invention, however, is not limited to the construction, operation, value or the like explained in the concrete examples of the embodiment described hereunder.

<Overall Structure of Medical Image Recording System>

Description hereunder is made, using a concrete example of ink-jet type image recorder as an example of a device for performing the image processing method of the present invention and also as an example of a device to which the medical image recording system of the present invention applies.

Figure 1:
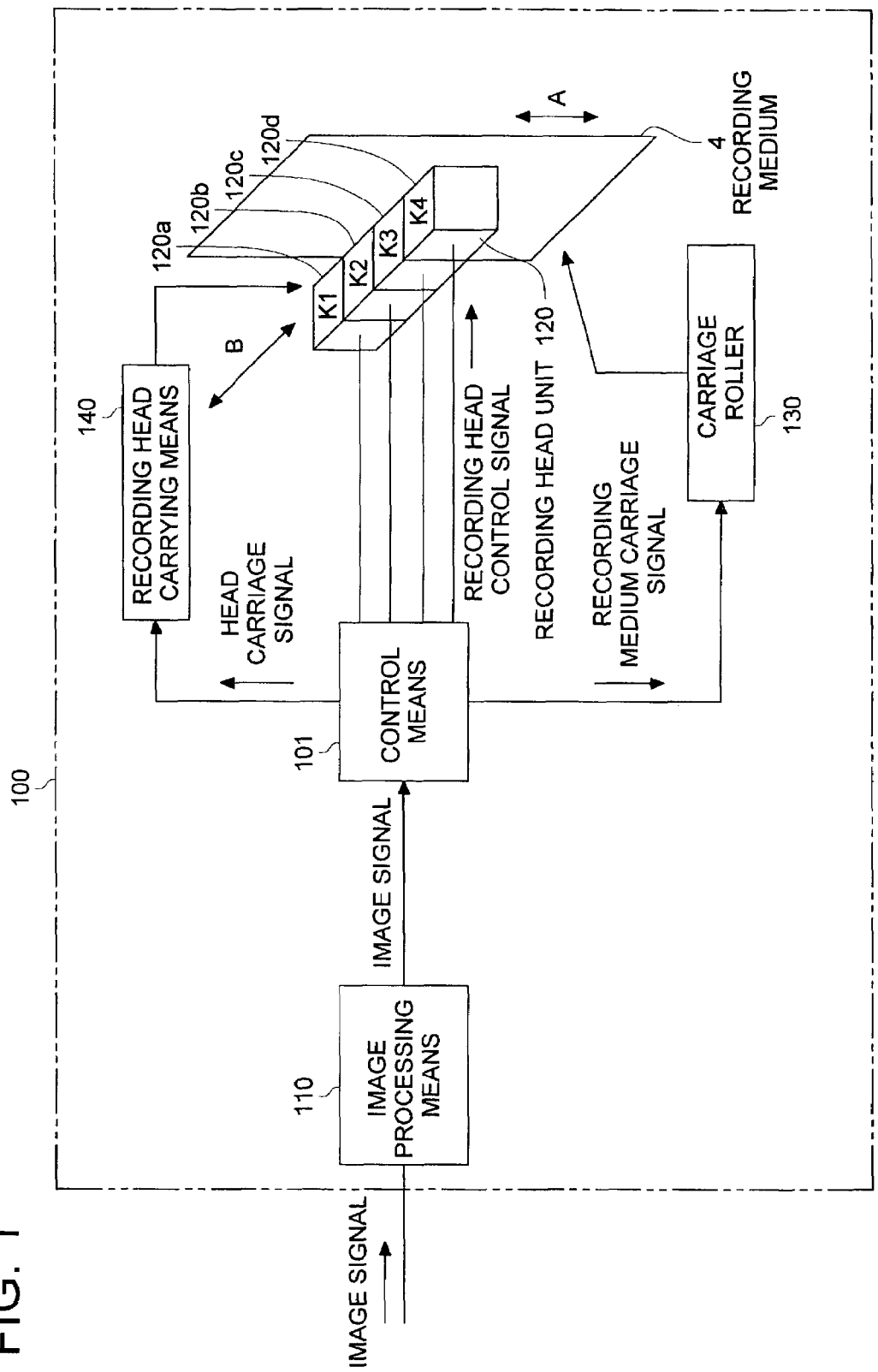
FIG. 1 is a block diagram showing a brief electrical construction of an image recorder according to an embodiment of the present invention.

FIG. 1 is a block diagram showing the function block relating to the image recording by the image recorder.

The image recorder 100 of the present embodiment has a recording head unit 120 as a recording means for recording images by ink emission.

A control means 101 controls each portion of the image recorder 100 of the present embodiment. Besides, in order to record an image, even though recorded on a reflex-type recording medium, that is as applicable to diagnosis as a transmission image, the control means 101 also takes charge of control over the dynamic range compression processing and frequency enhancement processing, of which control is one of the characteristics of the present embodiment.

110 is an image processing means, to which an image signal is inputted from an external medical photographing device or storage device, and performs necessary image processing. In order to record an image, even though recorded on a reflex-type recording medium, that is as applicable to diagnosis as a transmission image, the processing means also performs the dynamic range compression processing and frequency enhancement processing, of which image processing is one of the characteristics of the present embodiment.

Besides, an image signal input from an external device may be sent via a network of various types. The image signal processed and obtained by the image processing means 110 is sent to the image control means 101.

The recording head unit 120 is equipped with four recording heads 120a to 120d in series for black ink K1 to K4 of different density, respectively, and a recording head control signal is supplied from the control means 101 to each of them. These recording heads 120a to 120d may be integrated or installed separately. Generating an image using four different types of ink as above enables to obtain higher quality and better multi-gradation as an image used for medical diagnosis or reference. To generate an image for medical use that is required to have multi-gradation, it is preferable to use three to four kinds of ink of different density.

Incidentally, "plural kinds of inks, densities of which are different relative to each other while colors of which are substantially the same" means that hues of the inks are essentially almost the same. Concretely speaking, in the CIE 1976 L*a*b* color space, metric hue-angle values of the inks are near relative to each other, while only L* values are different relative to each other in its combination.

In order to eliminate string-like irregularity peculiar to the image recorder, emitting the ink evenly from the recording head onto the recording surface is necessary, and as a result, thicker ink receiving layer is needed as the ink absorption increases. If the ink receiving layer is made thicker, scratches are apt to be caused on the recording surface, and hence more careful handling of the recording medium is required.

The ink emission mechanism of the ink-jet head may be an ink-jet type that utilizes the piezo electric effect or utilizes a bubble forming force generated at the time when the ink is heated momentarily. The number of nozzle holes suitable for an ink-jet type for medical application is about 64 to 512. The traveling speed of ink particles is preferably 2 to 20 m/s and the amount of ink particles per emitted drop is preferable 1 to 50 pico litter.

130 is a carriage roller that carries the recording medium in the main scan direction. 140 is a recording head carriage means that carries the recording head in the sub scan direction. Herein, the carriage roller 130 carries the recording medium 4 in the arrow A direction based on the recording medium carriage signal. The head unit carriage means 140 is installed to allow the recording head unit 120 to move in the direction B perpendicular to the carriage direction of the recording medium 4.

The recording head carriage means 140 moves the recording head unit 120 in the arrow B direction according to the head carriage signal. Each of the recording heads 120a to 120d generates an image on the recording medium 4 based on the recording head control signal. To the control means 101, an image signal is sent from the image processing means 110, and to the image processing means 110, an image signal is inputted from an external photographing device or storage device. Input to the image processing means may be sent via a network.

<Explanation on Recording Medium>

A characteristic of the recording medium described in the present embodiment is that, in practice, a monochrome image is depicted on it with liquid ink. It is preferable that the medium is a sheet with an area of practically 15×10 cm or more, four corners being cut round, made of colorless or blue resin with a thickness of 75 to 250 μm at least, having at least one void-type ink absorption layer on one side.

If the thickness is less than 75 μm, the medium is hard to handle because of sagging down of the sheet. If the thickness is more than 250 μm, on the contrary, fairly heavy weight is disadvantageous in bringing a pile of the sheets.

The recording medium described in the present embodiment is preferably of a type that at least one void-type ink absorption layer is provided on at least one side and the other side with no ink absorption layer has a matted layer so as to assure the mechanical carriage performance of printer or to prevent multiple sheets of film, when piled up, from sticking to each other.

The recording medium described in the present embodiment can be produced by increasing the percentage of voids of the ink absorption layer as much as possible and subjecting the surface to mat treatment to generate unevenness.

Besides, white metallic oxide such as titanium oxide or lead oxide can be added to the ink absorption layer or a layer under it.

It is also possible to form a layer on one side of the backing opposite to the other side having the ink absorption layer and disperse the metallic oxide such as titanium oxide or lead oxide over the layer, or to provide the ink absorption layer on both sides of the backing.

The reflex-type recording medium described in the present embodiment has opaque backing and transmission recoding medium has transparent backing, wherein, for example, one disclosed in the Japanese Application Patent Laid-open Publication No. HEI 9-254521 (1997) is preferably used as an opaque backing and one disclosed in the Japanese Application Patent Laid-open Publication No. HEI 10-76751 (1998) as a transparent backing.

Materials applicable to opaque backing are uncoated paper including wood free paper, mid-quality paper, super calendar treated paper, one-side glazed stencil paper, and tracing paper, coated paper including art paper, coat paper, light-weight coat paper, micro-coated paper, and cast coat paper, film including plastic film, pigment contained opaque paper, and foamed paper, resin coated paper, resin impregnated paper, non-woven cloth, cloth, and a compound thereof. In view of the glossiness and smoothness, resin coated paper and each type of film are preferred, and in view of the feeling of touch and impression of high quality, resin coated paper and polyolefin type film are more preferred.

Materials applicable to transparent backing are polyester type such as polyethylene-terephthalate (PET), cellulose ester type such as nitro cellulose and cellulose acetate, and besides, polysulfone, polyimide, and polycarbonate. The sheet recording medium shall preferably be colored blue. This blue color is added to prevent the eye from being dazzled by excessive transmitted light through non-image portion as explained above, and also to produce an effect of allowing a black image to appear favorably.

Since at least one side of the sheet backing is provided with an ink absorption layer, the backing of the recording medium must be subjected to corona discharge treatment, flame treatment or ultraviolet ray irradiation treatment to enhance the adhesion of the ink absorption layer.

The ink absorption layer shall preferably be a layer of three-dimensional mesh structure having the percentage of voids of 40% to 90%. It is preferable that the three-dimensional mesh structure is made of silica particles or organic particles, having an average particle size of 20 nm or less, and water-soluble resin, and the mass ratio of the silica particles or organic particles to the water-soluble resin is within a range of 1.2:1 to 12.1.

When the above is met, the pores that form the voids of the three-dimensional mesh structure has an average diameter of 5 to 40 nm and the pores forming the voids has the pore capacity of 0.3 to 1 ml/g.

It is preferable that silica particles are of silicic acid, having two to three silarol groups per surface area 1 $nm^2$, and that the three-dimensional mesh structure is made of chains that are formed by the coupling of secondary particles, having a size of 10 to 100 nm, of the aggregated silica particles.

Applicable particles include, for example, colloidal silica, potassium silicate, zeolite, kaolinite, halloysite, muscovite, talc, calcium carbonate, calcium sulfate, and aluminum oxide.

Water-soluble resin shall preferably be polyvinyl alcohol, but gelatin or one disclosed in the Japanese Application Patent Laid-open Publication No. HEI 7-276789 (1995) is also applicable.

The ink absorption layer shall preferably have the specific surface area of 50 to 500 $m^2/g$. Besides, to prevent sheets, when piled up, from sticking to each other, it is preferable to disperse mat particles having an average particle size of 5 to 100 μm on the surface.

It is acceptable to add surface active agent as antistatic agent.

The surface with no ink absorption layer can be coated with gelatin or water-soluble resin to prevent curling. It is also acceptable that this layer is subjected to antistatic treatment, mat treatment for preventing sticking, and coloring blue, and also coated with metallic oxide particles such as titanium oxide particles and lead oxide particles.

At the time of transmission radiograph observation, a number of films are frequently treated. In order to ensure smooth recognition of the surface and rear of an image at a glance, it is preferable to provide a notch, for example, on the upright corner of each sheet so that the surface and rear of the sheet can easily be recognized.

<Description on Ink>

In the present embodiment, it is possible to generate an image by emitting multiple inks of different tone, using the ink-jet heads that are a means for emitting multiple inks separately and independently. Besides, it is also possible to generate an image by emitting multiple monochromatic inks of different density, using the ink-jet heads that are a means for emitting multiple inks separately and independently.

In other words, when these inks are used independently or in combination as monochromic ink in multiple grades of density, for example, two grades, three grades or four grades, different ink-jet head can be employed for each ink density. For example, K1, K2, K3 and K4 inks are applicable for generating a monochromatic image. For generating a color image, each ink-jet head is needed for each ink, for example, yellow (Y), magenta (M), cyan (C), and black (B).

For the coloring material that solves or disperses into ink water, any one of pigment, water-soluble dye and dispersing dye is applicable.

Applicable pigment is any known organic or inorganic pigment. For example, inorganic pigment includes azo pigment such as azolake, insoluble azo pigment, condensed azo pigment, and chelate azo pigment, polycyclic pigment such as phthalocyanine pigment, perylene and perylene pigment, anthraxquinone pigment, quinaklydone pigment, dioxanezene pigment, thioindigo pigment, isoindolinone pigment, and quinophthaloni pigment, dye lake such as basic dye type lake and acid dye type lake, and nitro pigment, nitroso pigment, aniline black, and daylight fluorescent pigment, and organic pigment includes carbon black.

Applicable equipment for dispersing the pigment includes ball mill, sand mill, Atlighter, roll mill, agitator, Henschell mixer, colloid mill, ultrasonic homogenizer, purl mill, wet jet mill, and paint shaker. While dispersing the pigment, dispersing agent can also be added. Applicable dispersing agent includes anion type or nonion type surface active agent, and polymer dispersing agent.

The ink used in the present embodiment can be prepared as black ink by selecting suitable pigments or using a single kind of known dye or dyes in combination.

Applicable water-soluble dye includes, for example, acid dye, basic dye, and reactive dye.

Applicable black dye includes, for example, CI (color index) Direct Black 9, 17, 19, 22, 32, 51, 56, 62, 69, 77, 80, 91, 94, 97, 108, 112, 113, 114, 117, 118, 121, 122, 125, 132, 146, 154, 166, 168, 173, and 199.

The ink used in the present embodiment can be prepared as black ink by selecting suitable pigments or using a single kind of known dye or dyes in combination.

For example, water-soluble black ink that is liquid in normal temperature is prepared when carbon black is used as pigment and ethylene glycol material and surface active agent or antiseptic agent are mixed.

In case of using dye, water-soluble black ink that is liquid in normal temperature is prepared when Direct Black 19, Direct Black 159, Surfer Black 1, Acid Black 2, or CI Food Black 2 is mixed into a solution containing ethylene glycol, glycerin, surface active agent, and antiseptic agent. An appropriate amount of Direct Black 19 (blue ink) is mixed to adjust the tone.

In generating an image, it is preferable to employ a combination of inks with different density and tone, using the inks prepared as above, vary the finely in harmony with the variation of density of the image, and cover as wide density range as possible.

When inks of different tone are employed, Acid Blue 9, Acid Red 52 or 94, Acid Yellow 23, Direct Yellow 86 or 142 is used as coloring material. Besides, for example, use of an ink disclosed in the Japanese Application Patent Laid-open Publication No. 2000-129182 is also preferable in this embodiment.

Applicable water-soluble organic solvent includes alcohol group (for example, alcohols (for example, methanol, ethanol, isopropanol, butanol, isobutanol, secondarybutanol, tertiarybutanol, pentanol, hexanol, cyclohexanol, and benzyl alcohol), polyatomic alcohol group (for example, ethylene glycol, diethylene glycol, triethylene glycol, polyethylene glycol, propylene glycol, dipropylene glycol, polypropylene glycol, butylene glycol, hexanediol, pentanediol, glycerin, hexanetriol, and thiodiglycol) polyatomic alcohol ether group (for example, ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, propylene glycol monomethyl ether, propylene glycol monobutyl ether, ethylene glycol monomethyl ether acetate, triethylene glycol monomethyl ether, triethylene glycol monoethyl ether, triethylene glycol monobutyl ether, ethylene glycol monophenyl ether, and propylene glycol monophenyl ether), amine group (for example, ethanol amine, diethanol amine, triethanol amine, N-methyl diethanol amine, N-ethyl diethanol amine, morpholine, N-ethyl morpholine, ethylene diamine, diethylene diamine, triethylene tetramine, tetraethylene pentamine, polyethylene imine, pentamethyl diethylene triamine, and tetramethyl propylene diamine), amide group (for example, form amide, N,N-dimethyl form amido, N,N-dimethyl acetoamide), hetrocyclic group (for example, 2-pyrolidone, N-methyl-2-pyrolidone, cyclohexyl pyrolidone, 2-oxazolidone, and 1,3-dimethyl-2-imida zolidinone), sulfoxid group (for example, dimethyl sulfoxid), sulfone group (for example, sulfolane), urea, acetonitril, and acetone.

Surface active agent may be added to ink, as needed. Favorable surface active agent for ink includes anionic surface active agent such as dialkyl-sulfo succinic acid, alkyl naphthalene sulfonate, and fat acid salt, nonionic surface active agent such as polyoxy-ethylene alkyl ether, polyoxi-ethylene allyl ether, acetylene glycol, and polyoxypropylene block copolymer, and cationic surface active agent such as alkyl amine salt and Class-4 ammonium salt.

In addition to the above, other materials such as mildew preventing agent, pH conditioning agent, and viscosity conditioning agent can be added to the ink, as needed.

<Explanation on Terms>

In the present Specification, "density of image to be recorded on a transparent-type recording medium" means optical density and transmitted diffusion density. The transmitted diffusion density was measured using a densitometer (PDA-65) manufactured by Konika Co., Ltd. Light source was a standard light source A (equivalent to 2856K Black Body Radiation) comprising a tungsten lamp, and light receiving element was an electron multiplication tube comprising a photoelectric face made of antimonic cesium. Filter was a neutral filter for sensitivity adjustment, which exhibited nearly equal spectra transmission factor at every wavelength. With these, so-called black-and-white density was measured. "density of image to be recorded on a reflex-type recording medium" means reflected diffusion density and it was measured also with PDA-65.

In addition, the "spectral reflectance" in the present Specification was measured using a high-speed spectral photometer CA-35 manufactured by Murakami Coloring Technology Laboratory within a range of 390 to 730 nm. Light source for supplying light onto a specimen was a halogen lamp.

In addition, "light scattering inside the recording medium" in the present Specification means light scattering generated inside the image forming layer due to multi-reflection. In the low density area, because the quantity of light that is not reflected on the interface of the recording medium nor absorbed by the coloring material but goes into the recording medium is high, the quantity of light scattered is higher accordingly and light scattering is caused in wide area inside the recording medium, and therefore the image is blurred (that is, the sharpness deteriorates). In the high density area, on the other hand, because much of the quantity of light is absorbed by the coloring material, the quantity of light scattered is lower accordingly and less light scattering is caused, and therefore the image is blurred less frequently.

Further, generally speaking, "transmission image" means an image used for transmissible observation, and which is suitable for the method of observing the image in a transmissible observation mode. Incidentally, the transmissible observation mode is such an observation mode that an axially light source (a back light, so to speak), having a high-bright illumination capability, is disposed behind the image, and penetration light, emitted from the axially light source and penetrated through the image, are mainly used for the observation of the image. Still further, "transparent-type recording medium" is mainly employed for observing the image as the transmission image.

Still further, generally speaking, "reflection image" means an image used for reflectional observation, and which is suitable for the method of observing the image in a reflectional observation mode. Incidentally, the reflectional observation mode is such an observation mode that an axially light source is disposed in front of the image, and reflection light, emitted from the axially light source and reflected from the image, are mainly used for the observation of the image. Still further, "reflex-type recording medium" is mainly employed for observing the image as the reflection image.

<Operation of Image Recorder>

The image recorder of the present embodiment has an image processing means 110 (See FIG. 1) for correcting the variation of sharpness because of the type of the image recorder or recording medium. So-called dynamic range compression processing and frequency enhancement processing are applicable to the image processing in the image processing means 110. As a result of the correction by the dynamic range compression processing and/or frequency enhancement processing, it becomes possible to record an image, either to be recorded on a reflex-type recording medium or on a transmission image, that is applicable similarly to diagnosis.

The "dynamic range compression processing" performed by the image recorder of the present embodiment is to process an image signal Sorg representing the original image and obtain a processed image signal Sproc that represents an image having narrower dynamic range than the original image.

An example of the dynamic range compression processing is, for example, disclosed in the Japanese Application Patent Laid-open Publication No. HEI 3-222577 (1991); wherein the original image signal Sorg within a specified range around each pixel point is averaged as it is compared with each pixel point and an unsharp image signal Sus is obtained, and when a function that monotonously decreases as the value of the unsharp image signal Sus increases is denoted f1 (Sus), the processed image signal Sproc is obtained using the equation below:

$$Sproc = Sorg + f1(Sus)$$

Figure 2:
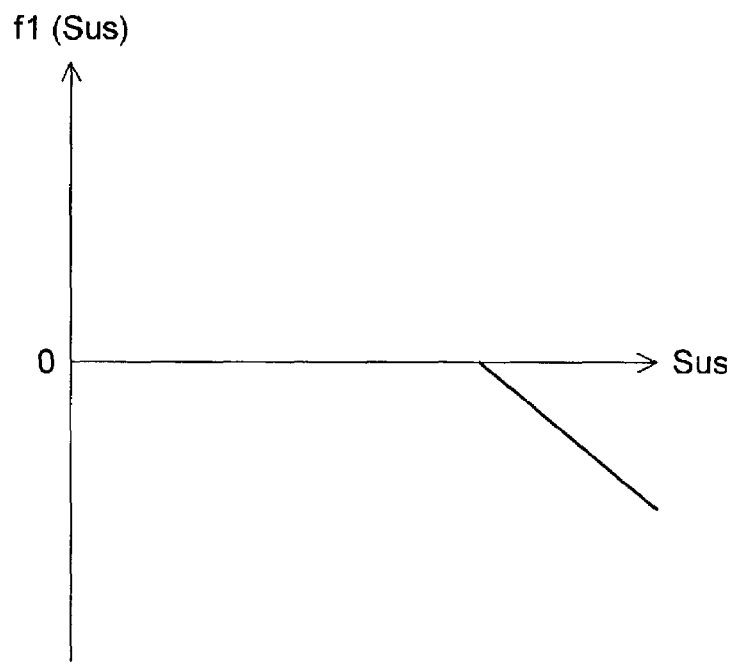
FIG. 2(a) and FIG. 2(b) are explanatory figures showing the characteristic of a characterized portion of an image recorder according to an embodiment of the present invention.
Figure 2:
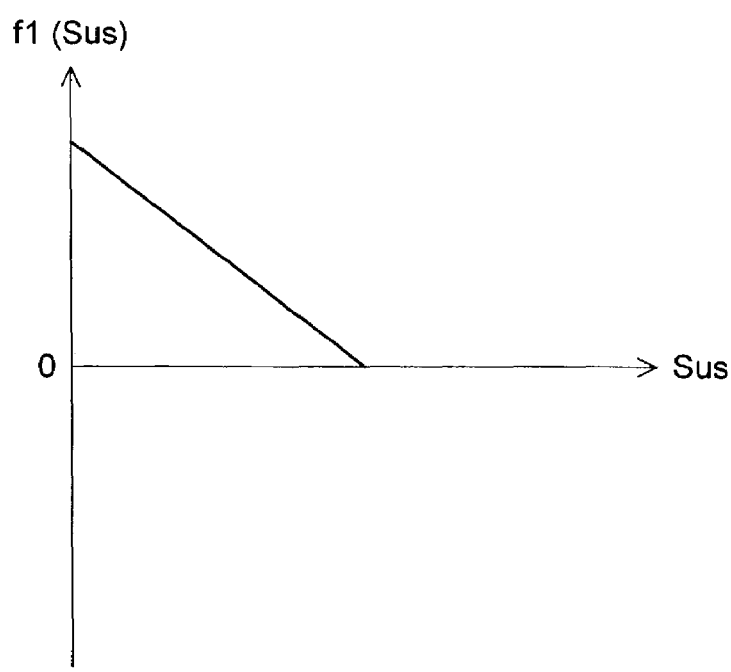

The above unsharp image signal is obtained by using, for example, an unsharp mask of a specified size, positioning the pixel concerned at the center of the mask, and then averaging the image signals of the pixels inside the mask. FIG. 2(a) and FIG. 2(b) shows each example of the function f1 (Sus).

The characteristic shown in FIG. 2(a) is an example of compressing the dynamic range of the high density range, of which processing is effective for an image, for example, on bones such as limbs in case of transmitted image. The characteristic shown in FIG. 2(b) is an example of compressing the dynamic range of the low density range, of which processing is effective for an image, for example, on breast from the front.

The "high density range" in the medical image recording system of the present invention means approximately an upper half of the image density range that can be recorded on a recording medium, and "compressing the dynamic range of the high density range" is equivalent to performing a processing so that the dynamic range is compressed in, at least, whole or part of the image signals corresponding to the high density range.

The "low density range" in the medical image recording system of the present invention means approximately a lower half of the image density range that can be recorded on a recording medium, and "compressing the dynamic range of the low density range" is equivalent to performing a processing so that the dynamic range is compressed in, at least, whole or part of the image signals corresponding to the low density range.

If the density range of an image is narrowed through a gradation processing, both contrast of large structure and contrast of fine structure, such as vessel, decrease at the same time. In the dynamic range compression processing, however, because only low frequency components corresponding to the contrast of large structure are attenuated and high frequency components corresponding to the contract of fine structure are maintained, decrease in the diagnostic resolution can be prevented even if the density range narrowed.

Figure 3:
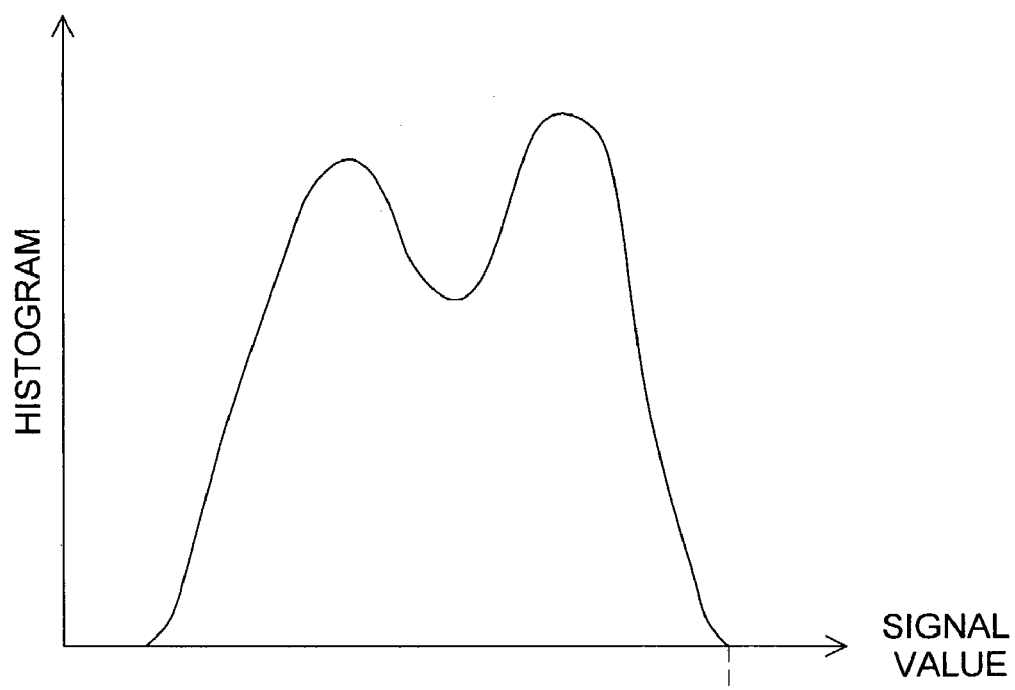
FIG. 3 is an explanatory figure showing the characteristic of a characterized portion of an image recorder according to an embodiment of the present invention.
Figure 3:
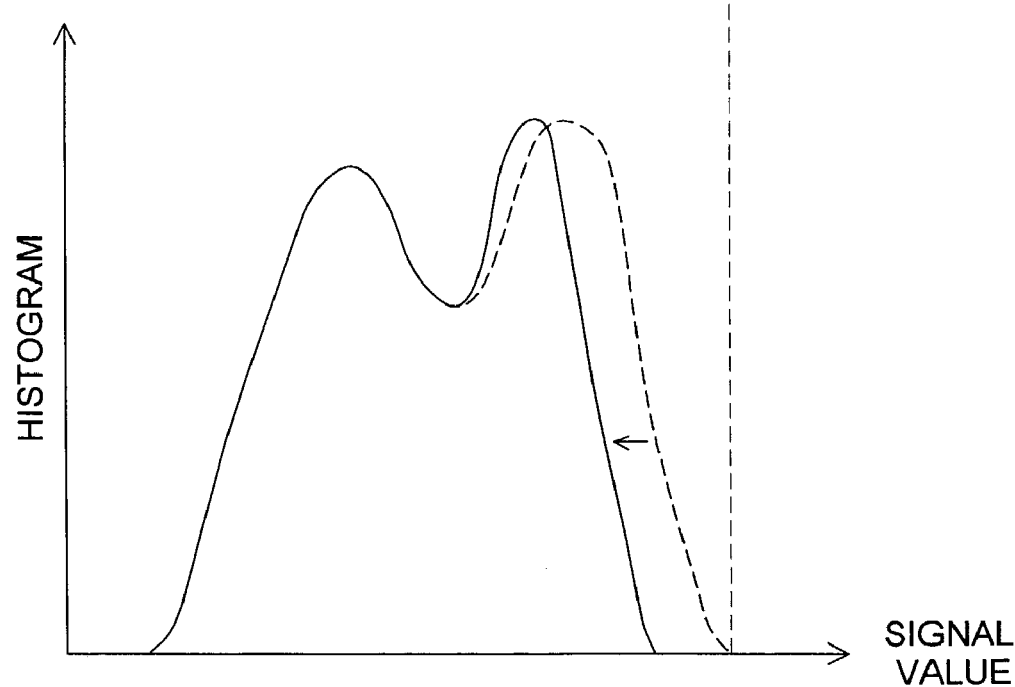

Because the reflected density depending upon the amount of coloring material for exhibiting color saturates in the high density range on a reflected image as shown in FIGS. 7(a)-7(e), and so the depicturable dynamic range is narrower than on a transmitted image, it is preferable in case of a reflected image to compress the dynamic range of the high density range as shown in FIG. 2(a) so that the image signals can fall within a range where the reflected density does not saturate (See FIG. 3).

As explained above, the dynamic range compression processing is also effective for a transmitted image. It is preferable that a dynamic range compression processing effective for a reflected image is performed in addition to a dynamic range compression processing effective for a transmitted image.

Figure 4:
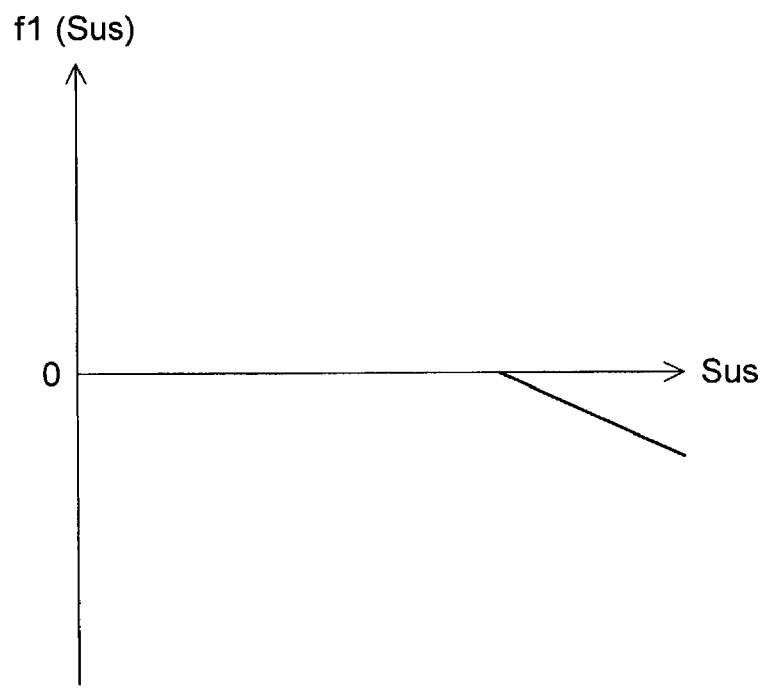
FIG. 4(a) and FIG. 4(b) are explanatory figures showing the characteristic of a characterized portion of an image recorder according to an embodiment of the present invention.
Figure 4:
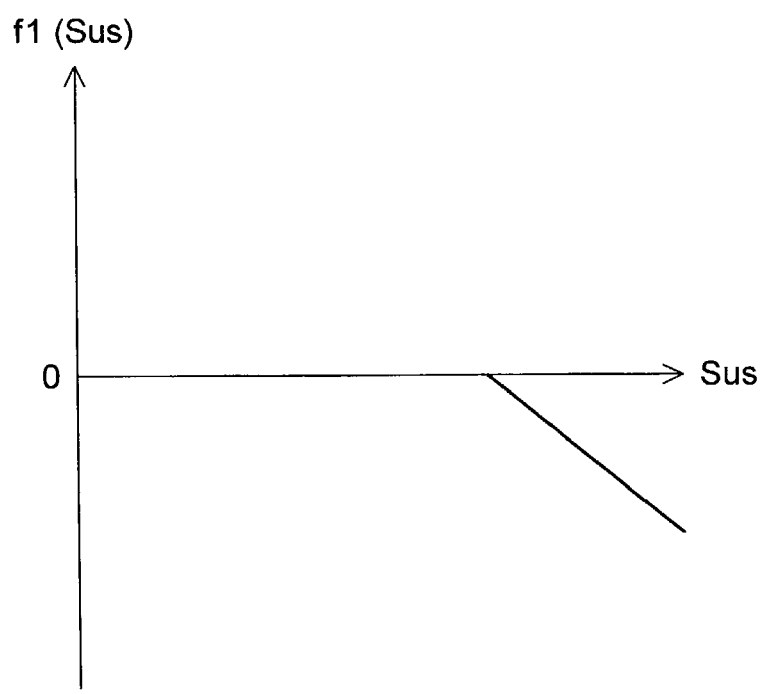

When the dynamic range compression processing on the high density range is effective for a transmitted image, it is preferable to apply higher dynamic range compression on the high density range than on a transmitted image. To be concrete, for example, a function f1 (Sus) as shown in FIG. 4(a) is set for a transmitted image and another function f1 (Sus) as shown in FIG. 4(b), having greater gradient than in FIG. 4(a), is set for a reflected image.

Figure 5:
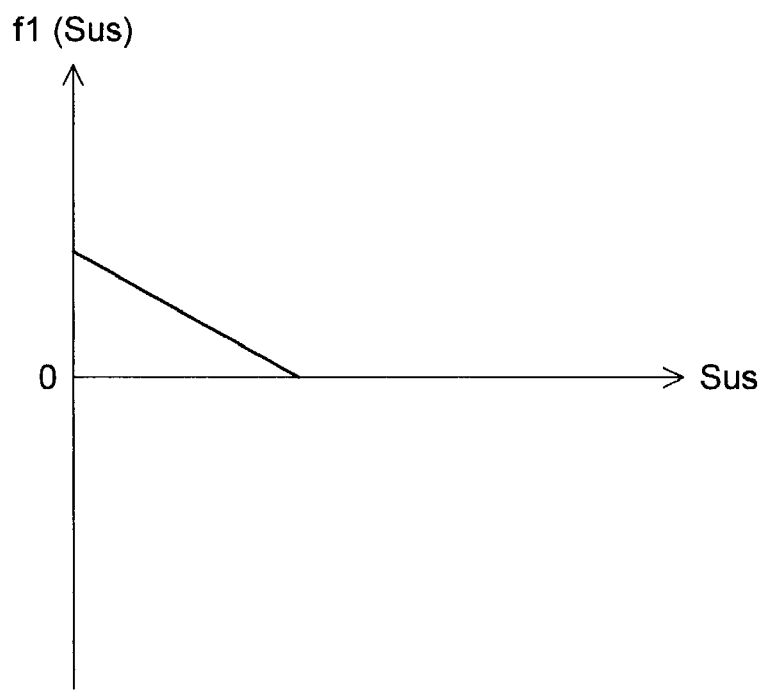
FIG. 5(a) and FIG. 5(b) are explanatory figures showing the characteristic of a characterized portion of an image recorder according to an embodiment of the present invention.
Figure 5:
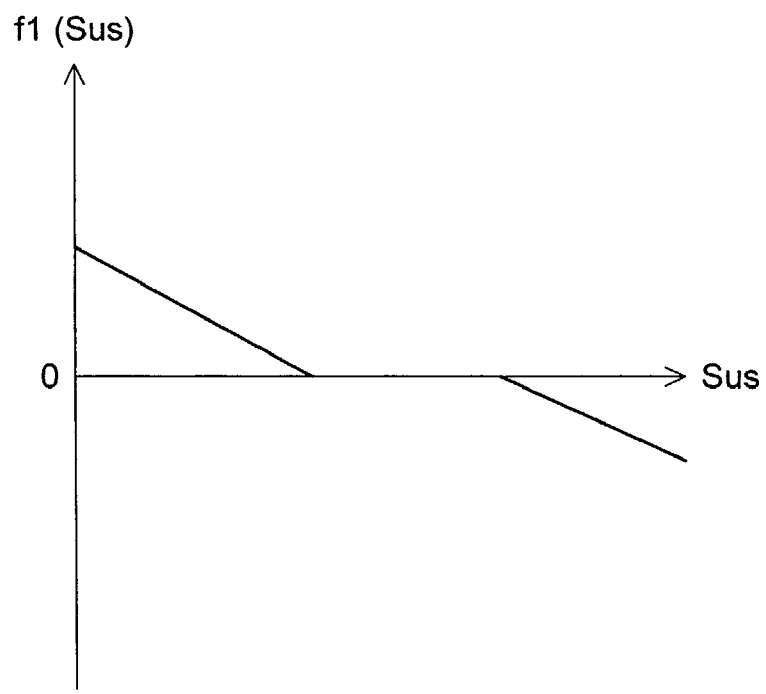

When the dynamic range compression processing on the low density range is effective for a transmitted image, it is preferable to also compress the dynamic range of the high density range in addition. To be concrete, for example, a function f1 (Sus) as shown in FIG. 5(a) is set for a transmitted image and another function f1 (Sus) as shown in FIG. 5(b) is set for a reflected image.

Frequency enhancement processing performed on the image recorder of the present embodiment includes an unsharp masking processing or a method where an image signal is subjected to Fourier transformation, to filtering processing in the frequency space, and then to inverse Fourier transformation. So-called unsharp masking processing is explained hereunder.

In the frequency enhancement processing, the sharpness level can be controlled, for example, through the unsharp masking processing represented by the expression below. Besides, a method disclosed in the Japanese Application Patent Laid-Open Publication Nos. SHO 55-163472 (1980), SHO 62-62373 (1987), and SHO 62-62376 (1987) is applicable to this control.

The "frequency enhancement processing" is to process an original image signal Sorg that represents an original image and obtain a processed image signal Sproc that represents an image on which the frequency components higher than the ultra-low spatial frequency of the original image have been exaggerated. For example, as disclosed in the Japanese Application Patent Laid-open Publication No. SHO 55-87953 (1980), the original image signal Sorg within a specified range around each pixel point is averaged as it is compared with each pixel point and an unsharp image signal Sus is obtained; and, when the exaggeration factor is denoted β, the processed image signal Sproc is obtained by the formula below:

$$Sproc = Sorg + \beta \times (Sorg - Sus)$$

The above-mentioned ultra-low spatial frequency is a frequency corresponding to the mask sized of the unsharp masking processing used for obtaining the unsharp image signal Sus.

The sharpness deteriorates heavily in the low density range because of lower optical absorption of coloring material and higher light scattering inside the recording medium, and hence it is preferable that the higher the exaggeration factor of the frequency enhancement processing is set, the lower the image density is. To be concrete, it is preferable that at least either one of the exaggeration factor β or mask size in the unsharp masking processing decreases monotonously as the image density increases. By "decreasing monotonously" in this Specification, it is not always necessary to continue increasing proportionally as the image density increases but increasing may contain a portion where increase is constant irrespective of the image density.

Besides, the light scattering inside a reflecting recording medium is greater than inside a transparent-type recording medium, and so the deterioration of sharpness resulting from the light scattering is remarkable. Because of this, it is desirous to select the image processing condition so that the modulation transfer function relevant to the image processing at 2.0 cycle/mm under the image processing condition for recording on a reflection medium has a greater value than the modulation transfer function relevant to the image processing at 2.0 cycle/mm under the image processing condition for recording on a transmission medium.

When the modulation transfer function relevant to the image processing at 2.0 cycle/mm under the image processing condition for recording on a reflection medium has a value of 1.5 times or more as great as the modulation transfer function relevant to the image processing at 2.0 cycle/mm under the image processing condition for recording on a transmission medium, greater effect can be produced as the sharpness of the spatial frequency components that are important for diagnosis and easily influenced by the sharpness deterioration on a transmitted image.

Switching the exaggeration factor as above can be realized by a processing where at least either one of the exaggeration factor β or mask size in the unsharp masking processing is set greater in case of recording on a reflex-type recording medium than in case of recording on a transparent-type recording medium.

As described above, employing a formula Sproc=Sorg+β×(Sorg−Sus) makes it possible to perform the exaggeration processing in less computation time and with simple construction, and is desirous particularly because parameters such as the exaggeration factor β or mask size in the unsharp masking processing can be switched easily in accordance with the image density or type of the recording medium.

Besides, in this embodiment, the multi-resolution image exaggeration processing can apply as an example of the above-mentioned frequency enhancement processing. The multi-resolution image exaggeration processing is a frequency processing to adjust the frequency response characteristic of the add signal to be added to the original image signal Sorg and is capable of preventing generation of artifact on the image processed through the frequency exaggeration.

The multi-resolution image exaggeration processing is a processing, for example, as disclosed and so-called as a multi-frequency processing in the Japanese Application Patent Laid-Open Publication No. HEI 10-75395 (1998), where multiple unsharp image signals having different sharpness level, that is, different modulation transfer function relevant to the unsharp masking processing are generated, and multiple limited-band image signals (hereinafter called band pass signals) that represent the frequency components of limited frequency bands of the original image signal are generated by calculating the differential between two signal values out of the unsharp image signals and original image signal. Then, the band pass signals are converted to a desired size using each different conversion function, and the above-mentioned add signal is generated by integrating the multiple restricted band pass signals. This processing can be expressed, for example, by the formula below.

$$Sproc=Sorg+\beta(Sorg) \times Fusm(Sorg, Sus1, Sus2, \ldots SusN)$$

$$Fusm(Sorg, Sus1, Sus2, \ldots SusN)=f1(Sorg-Sus1)+f2(Sus1-Sus2)+\ldots +fk(Susk-1-Susk2)+\ldots +fN(SusN-1-SusN)$$

where

Sproc: processed image signal, Sorg: original image signal, Susk (k=1 to N): unsharp image signal, fk (k=1 to N): conversion factor for converting each band pass signal, and β(Sorg): exaggeration factor that is determined based on the original image signal.

In this frequency enhancement processing, the frequency response characteristic of the add signal to be added to the original signal can be adjusted by changing the parameters of the conversion function that converts the band pass signal. Because of this, a processed image signal having desired frequency response characteristic, such as one for preventing the generation of artifact, can be obtained simply depending upon the definition of each conversion function.

The parameters for each image processing is the information (value) necessary for performing each image processing. For example, the above-mentioned mask size in the unsharp masking processing and function f1 (Sus) are the ones for the dynamic range compression processing. Besides, the mask size in the unsharp masking processing and exaggeration factor β are the ones for the frequency enhancement processing, and the mask size of the unsharp masking processing used for obtaining each unsharp image signal Susk (k=1 to N), conversion function fk (k=1 to N) for converting each band pass signal, and the exaggeration factor β(Sorg), a function of the relationship between the exaggeration factor β and the original image signal Sorg, to be determined based on the original signal are the ones for the above multi-frequency processing.

In addition, applying a so-called pyramid algorism to the multi-resolution method enables to speed up computation. The basic concept of the pyramid algorism and efficient way for decomposing the pyramid are described in the literatures below:

"Fast Filter Transform for Image Processing" by Burt P. J. on "Computer Graphics and Image Processing" Vol. 16, pages 20-51, 1981, and "Fast Computation of the Difference of Low-Pass Transform" by Crowley J. L., Stern R. M., translated by IEEE, on "Pattern Analysis and Machine Intelligence" Vol. 6, No. 2, March 1984. Some other report on the multi-resolution method is found in "A Theory for Multiresolution Signal Decomposition: The Wavelet Representation" by Mallat S. G., translated by IEEE, on "Pattern Analysis and Machine Intelligence" Vol. 11, No. 7, July 1989, and "Image Processing by Gabor Expansion" by Ebrahimi T., Kunt M. on "Optical Engineering" Vol. 30, No. 7, pages 873-880, July 1991.

In particular, the Laplacian pyramid is composed as follows. After a masking processing is performed on an original image with a mask that seems as if approximated by the Gaussian function, the processed image is subjected to sub-sampling to thin out the pixels and halve the number, and a blurred image of ¼ the size of the original image is obtained. Then, the blurred image is interpolated by inserting pixels comprising 0 into the sampled pixels to return the image size to the original. And then, another masking processing with the above mask is further performed to obtain a blurred image, and the blurred image is subtracted from the original image to obtain a fine image that represents specified frequency bands of the original signal. By repeating the above processing on the obtained blurred image so as to generate N-number of blurred images having the size of $1/2^{2N}$ of the original image. Although the Gaussian filter is employed in practice as above, a processed image that seems as if processed with a Laplacian filter is obtained, because the above sampling of pixels is performed on an image that has been subjected to the masking processing with a mask that seems as if approximated by the Gaussian function. Because a series of images, sequentially from the original image down to images with a size of $1/2^{2N}$ representing low frequency ranges are obtained as above, the images obtained through the processing is called a Laplacian pyramid.

Besides, a desired image signal can be obtained if a processing equivalent to either one of the frequency enhancement processing or the dynamic range compression processing is performed, using different conversion function for each band pass signal generated from the original image signal, and then each processed band pass signal is added.

<Outline of Processing in Present Embodiment>

In the image processing means of the image recorder described in the present embodiment, it is characteristic that the frequency enhancement processing is performed in addition to the dynamic range compression processing.

It is also characteristic that at least either one of dynamic range compression processing or frequency enhancement processing is performed and that an applicable image processing condition is selected out of multiple different image processing conditions, depending upon the type of recording medium to be used for recording. Herein "multiple different image processing conditions" means multiple different image processing conditions relevant to dynamic range compression processing in case of performing a dynamic range compression processing and multiple different image processing conditions relevant to image exaggeration processing in case of performing an image exaggeration processing. For example, in case of performing the above dynamic range compression processing, the above mask size in the unsharp masking processing and the above function f1 (Sus) constitute the different image processing condition. Beside, in case of performing the above image exaggeration processing, the above mask size in the unsharp masking processing and exaggeration factor β constitute the different image processing conditions. Further, in case of performing the above multi-frequency processing, the above mask size of the unsharp masking processing used for obtaining each unsharp image signal Susk (k=1 to N), conversion function fk (k=1 to N) for converting each band pass signal above, and the exaggeration factor β (Sorg), a function of the relationship between the exaggeration factor β and the original image signal Sorg, to be determined based on the original signal are the ones for the above multi-frequency processing constitute the different image processing conditions.

Figure 6:
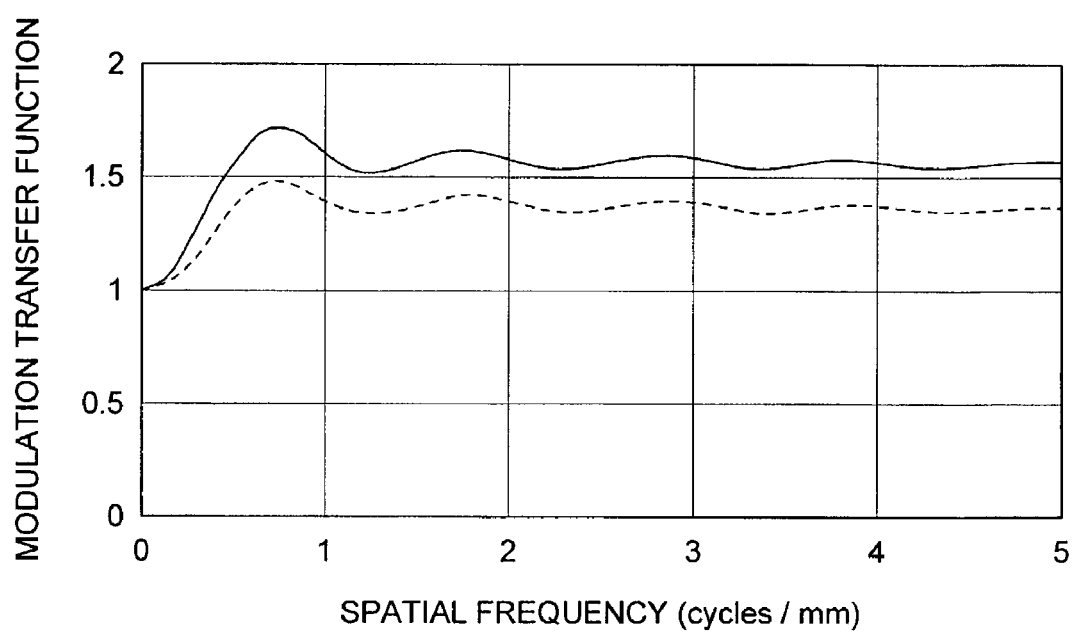
FIG. 6 is an explanatory figure showing the characteristic of a characterized portion of an image recorder according to an embodiment of the present invention.
Figure 7:
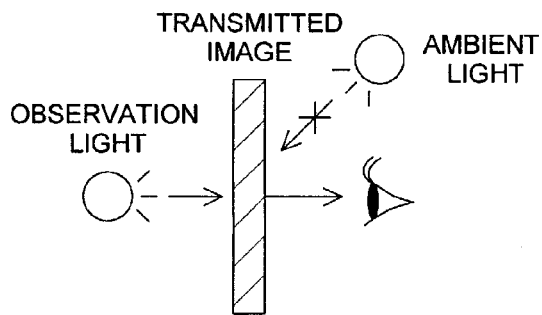
FIG. 7(a), FIG. 7(b), FIG. 7(c), FIG. 7(d) and FIG. 7(e) are explanatory figures showing the characteristics of transmitted image and reflected image.
Figure 7:
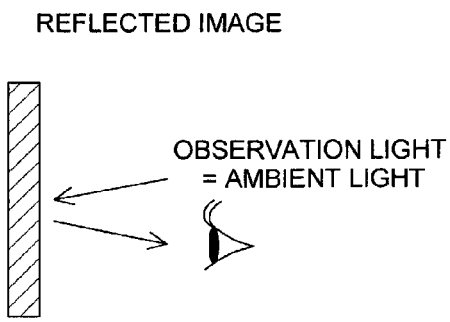
Figure 7:
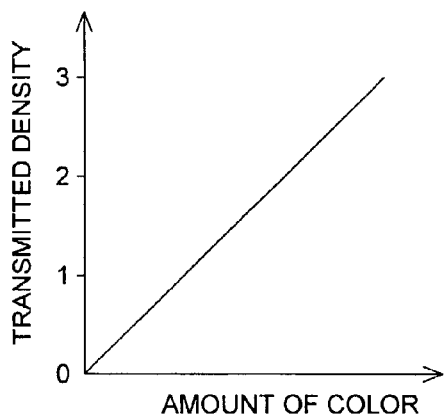
Figure 7:
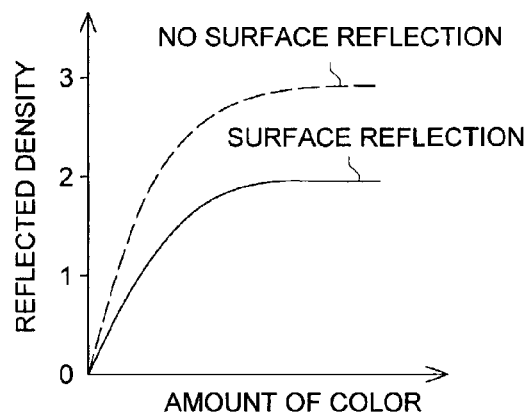
Figure 7:
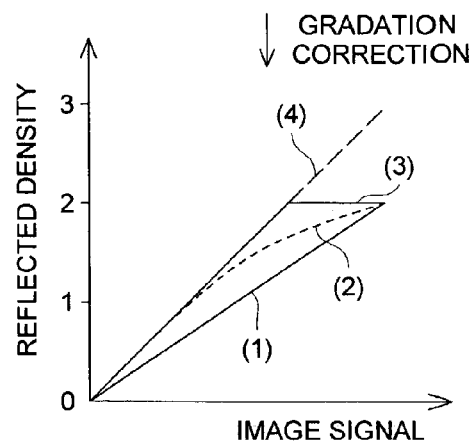

Explained hereunder, using FIG. 6 is what is meant by it that the lower the image density is, the greater the modulation transfer function relevant to the image processing at 2.0 cycle/mm is, or that the modulation transfer function relevant to the image processing at 2.0 cycle/mm under the image processing condition for recording on a reflection medium has a greater value than the modulation transfer function relevant to the image processing at 2.0 cycle/mm under the image processing condition for recording on a transmission medium.

FIG. 6 shows the frequency characteristic relevant to image processing, where the horizontal axis represents the spatial frequency and vertical axis represents the modulation transfer function. The frequency characteristic of the processed image signal turns to be the frequency characteristic of the original signal multiplied by the frequency characteristic relevant to the image processing as shown in FIG. 6. For example, provided that the bold line in FIG. 6 shows the modulation transfer function at lower image density and the dotted line shows the modulation transfer function at higher image density, the value of the bold line is higher than the value of the dotted line at 2.0 cycle/mm, which in turn means that the modulation transfer function relevant to the image processing at 2.0 cycle/mm is greater when the image density is lower. Besides, provided that the bold line in FIG. 6 shows the modulation transfer function under the image processing condition for recording on a reflection medium and the dotted line shows the modulation transfer function under the image processing condition for recording on a transmission medium, the value of the bold line is higher than the value of the dotted line at 2.0 cycle/mm, which in turn means that the modulation transfer function relevant to the image processing at 2.0 cycle/mm under the image processing condition for recording on a reflection medium is greater than the modulation transfer function relevant to the image processing at 2.0 cycle/mm under the image processing condition for recording on a transmission medium. In the above, it is preferable that a result of dividing the value of the bold line at 2.0 cycle/mm by the value of the dotted line is 1.5 or more.

As described in the foregoing, according to the present invention, the following effects can be attained.

(1) When a medical image is recorded on a reflex-type recording medium, the dynamic range compression processing is performed on the inputted image signal. Because the dynamic range compression processing is performed beforehand in the image processing stage before recording the image, it becomes possible to record an image, even though recorded on a reflex-type recording medium, that is as applicable to diagnosis as a transmission image.

(2) Because the dynamic range of particularly high density range is compressed, signals in the high density range, of which contrast becomes insufficient on a reflection image, shift to relatively low density side and therefore sufficient contrast can be kept, and hence it becomes possible to record an image, even though recorded on a reflex-type recording medium, that is as applicable to diagnosis as a transmission image.

(3) Because both dynamic range compression processing on particularly high density range and frequency enhancement processing are employed, not only the deficiency of contrast in the high density range can be eliminated but the deterioration of sharpness due to light scattering inside the recording medium can be recovered, and hence it becomes possible to record an image, even though recorded on a reflex-type recording medium, that is as applicable to diagnosis as a transmission image.

(4) Because both dynamic range compression processing on particularly high density range and frequency enhancement processing are employed, and also because the exaggeration by the frequency enhancement processing is increased in the low density range, the sharpness in the low density range, where the sharpness deteriorates heavily because of lower optical absorption of color and higher light scattering inside the recording medium, can be recovered, and hence it becomes possible to record an image, even though recorded on a reflex-type recording medium, that is as applicable to diagnosis as a transmission image.

(5) Because both dynamic range compression processing on particularly high density range and frequency enhancement processing are employed and the exaggeration by the frequency enhancement processing is increased in the low density range, and also because at least either one of the exaggeration factor β or mask size in the unsharp masking processing decreases monotonously as the image density increases, it becomes possible to realize the processing described in (4) above in less computation time and with simple construction.

(6) When conducting the processing described in item (3) or (4), because the multi-resolution image exaggeration processing is performed on the inputted image signal, deterioration of sharpness can be recovered sufficiently while generation of artifact is prevented, and hence it becomes possible to record an image, even though recorded on a reflex-type recording medium, that is as applicable to diagnosis as a transmission image.

(7) Because the above processing described in items (1)-(6) is performed at the time when the system records an image using multiple ink-jet heads, capable of emitting multiple inks of a same group but with different density from each other, it becomes possible to record an image, even though recorded with ink-jet on a reflex-type recording medium, that is as applicable to diagnosis as a transmission image.

(8) When conducting the processing described in item (7), because multiple ink-jet heads are selected depending upon the type of recording medium, multiple combinations of inks are selected for recording, and the inks to be selected can be so determined that the image density produced on the recording medium keeps a specified linear relationship with the image signal, and hence it becomes possible to record an image always with excellent gradation even in case the recording media is changed to a different one without adding any processing to the image signal.

(9) Because the system performs either one of the dynamic range compression processing or frequency enhancement processing and selects an image processing condition to apply out of multiple different image processing conditions, depending upon the type of recording medium to be used for recording, it becomes possible to record an image, either to be recorded on a reflex-type recording medium or on a transmission image, that is applicable similarly to diagnosis.

(10) The image processing condition selecting means sets the system so that, when the frequency enhancement processing is performed, the modulation transfer function relevant to the image processing at 2.0 cycle/mm under the image processing condition for recording on a reflection medium has a greater value than the modulation transfer function relevant to the image processing at 2.0 cycle/mm under the image processing condition for recording on a transmission medium. Because of this, more of the sharpness of an image recorded on a reflex-type recording medium where the sharpness deteriorates heavily because of light scatting inside the recording medium can be recovered, and hence it becomes possible to record an image, either to be recorded on a reflex-type recording medium or on a transmission image, that is applicable similarly to diagnosis.

(11) Because the modulation transfer function relevant to the image processing at 2.0 cycle/mm under the image processing condition for recording on a reflection medium has a value of 1.5 times or more as great as that for recording on a transmission medium, it becomes possible to further minimize the difference in the sharpness at the frequencies that are important for diagnosing the images recorded on a reflection medium and those recorded on a transmission medium.

(12) Because the modulation transfer function relevant to the image processing at 2.0 cycle/mm under the image processing condition for recording on a reflection medium has a value of 1.5 times or more as great as that for recording on a transmission medium, and also because at least either one of the exaggeration factor β or mask size in the unsharp masking processing decreases monotonously as the image density increases, it becomes possible to realize the processing described in item (11) above in less computation time and with simple construction.

(13) In items (9)-(12) above, because the exaggeration by the frequency enhancement processing is increased in the low density range, the sharpness in the low density range, where the sharpness deteriorates heavily because of lower optical absorption of color and higher light scattering inside the recording medium, can be recovered, it becomes possible to further minimize the difference in the sharpness at the frequencies that are important for diagnosing the images recorded on a reflection medium and those recorded on a transmission medium.

(14) Because the exaggeration by the frequency enhancement processing is increased in the low density range, and also because at least either one of the exaggeration factor β or mask size in the unsharp masking processing decreases monotonously as the image density increases, it becomes possible to realize the processing described in item (13) above in less computation time and with simple construction.

(15) In item (13) above, because the exaggeration by the frequency enhancement processing is increased in the low density range, and also because the multi-resolution image exaggeration processing is performed on the inputted image signal, deterioration of sharpness can be recovered sufficiently while generation of artifact is prevented, and hence it becomes possible to record an image, either to be recorded on a reflex-type recording medium or on a transmission image, that is applicable similarly to diagnosis.

(16) In item (9) above, because the dynamic range compression on images to be recorded on a reflex-type recording medium is set higher than the compression on images to be recorded on a transparent-type recording medium, the dynamic range of an image recorded on a reflex-type recording medium, of which expressible density range is narrower, can be compressed much narrower, it becomes possible to record an image, either to be recorded on a reflex-type recording medium or on a transmission image, that is applicable similarly to diagnosis.

(17) In item (9) above, because the image processing condition is so set that the compression on the high density range of images to be recorded on a reflex-type recording medium is set higher than the compression on the high density range of images to be recorded on a transparent-type recording medium, the dynamic range of the high density range of an image recorded on a reflex-type recording medium, on which the deterioration of contrast is particularly remarkable, can be compressed much narrower, and hence it becomes possible to record an image, either to be recorded on a reflex-type recording medium or on a transmission image, that is applicable similarly to diagnosis.

(18) In item (9) above, because the image processing condition is so set that the low density range of images is compressed for recording on a transparent-type recording medium and both low density range and high density range are compressed for recording on a reflex-type recording medium, the dynamic range of the high density range of an image recorded on a reflex-type recording medium, on which the deterioration of contrast is particularly remarkable, can be compressed much narrower and therefore the diagnostic resolution of the low density range, such as on an image on the breast, improves, and hence it becomes possible to record an image, either to be recorded on a reflex-type recording medium or on a transmission image, that is applicable similarly to diagnosis.

(19) In items (9)-(18) above, because the above processing is performed at the time when the system records an image using multiple ink-jet heads, capable of emitting multiple inks of a same group but with different density from each other, it becomes possible to record an image, even though recorded with ink-jet on a reflex-type recording medium, that is as applicable to diagnosis as a transmission image.

(20) In items (9)-(18) above, because a combination of ink-jet heads is selected depending upon the type of recording medium to be used for recording, the inks to be selected can be so determined that the image density produced on the recording medium keeps a specified linear relationship with the image signal, and hence it becomes possible to record an image always with excellent gradation even in case the recording media is changed to a different one without adding any processing to the image signal.

(21) In items (1)-(20) above, because the reflex-type recording medium is such that the spectral reflectance of diffuse reflected light from the recording medium at the wave length of 460 nm to 640 nm is at least 70% or more, sufficient quantity of reflected light can be gained for observing a medical image in a reflected state.

(22) In item (21) above, because the reflex-type recording medium comprises the backing made of white PET, sufficient quantity of reflected light is gained, and also because the backing has high durability, the medium is suitable for recording a medical image that needs to be stored for a long time.

(23) In items (10)-(20) above, because the transparent-type recording medium has the transmitted diffusion density of 0.4 or less, it becomes possible to observe a medical image, when observed in a transmitted state, with sufficient quantity of transmitted light.

(24) In item (23) above, because the transparent-type recording medium comprises the backing made of transparent PET containing blue dye, sufficient quantity of transmitted light is gained, and also because the backing has high durability, the medium is suitable for recording a medical image that needs to be stored for a long time.

In the foregoing, there has been indicated an example in which the relationship between the signal value and the image density is defined such that the higher the signal value is, the higher the image density to be recorded is. Accordingly, "to compress the dynamic range in the high density range" is to compress the dynamic range in a range of high signal values, and "to monotonously decreases with an increase of the image density" is to monotonously decreases with an increase of the signal value. On the other hand, when the relationship between the signal value and the image density is defined such that the higher the signal value is, the lower the image density to be recorded is, "to compress the dynamic range in the high density range" is to compress the dynamic range in a range of low signal values, and "to monotonously decrease with an increase of the image density" is to monotonously decreases with a decrease of the signal value.

As described in the foregoing, according to the present invention, it becomes possible to record a medical image, which can be utilized for making diagnosis, on a recording medium, even if the recording medium is a reflex-type recording medium, as well as a transparent-type recording medium.

Disclosed embodiment can be varied by a skilled person without departing from the spirit and scope of the invention.

What is claimed is:

1. A system for recording a medical image on a reflex-type recording medium, said system comprising:
    an image-processing section to apply a dynamic-range compression processing to original image signals which represent said medical image and which are inputted into the image-processing section, in order to generate output image signals; and
    an image-forming section to form a compressed medical image on said reflex-type recording medium, based on said output image signals generated by said image-processing section;
    wherein said dynamic-range compression processing includes compressing a dynamic-range of density variation to be expressed on said reflextype recording medium; and
    wherein, in addition to said dynamic-range compression processing, said image-processing section applies a frequency enhancement processing to said original image signals.

2. The system of claim 1, wherein said image-processing section applies said dynamic-range compression processing to said original image signals so as to compress said dynamic-range of said density variation in at least a high density range.

3. The system of claim 1, wherein, in said frequency enhancement processing, a value of a modulation transfer function with respect to an image-processing at 2.0 cycles/mm is increased as an image density is decreased.

4. The system of claim 3, wherein said image-processing section performs said frequency enhancement processing based on an equation of, $$Sproc = Sorg + \beta(Sorg - Sus),$$

where Sproc represents the output image signals generated by said image-processing section, Sorg represents the original image signals inputted into said image-processing section, Sus represents unsharp image signals generated by applying an unsharp-mask processing to said original image signals, and $\beta$ represents an emphasizing coefficient; and
    wherein at least one of said emphasizing coefficient $\beta$ and a size of a mask, employed for said unsharpmask processing, monotonously decreases with an increase of image density.

5. The system of claim 1, wherein said frequency enhancement processing is performed by using a multi-resolution image processing method, which employs a plurality of unsharp image signals that have different modulation transfer functions from each other with respect to an unsharp-mask processing.

6. The system of claim 1, wherein said imageforming section comprises:
    an inkjet printer which comprises an ink-jetting head that emits ink particles from plural kinds of inks, densities of which are different relative to each other while colors of which are substantially the same, so as to form an output medical image on said reflex-type recording medium, based on said output image signals generated by said image-processing section.

7. The system of claim 6, wherein said image-forming section further comprises:
   an ink-combination selecting section to select a combination of inks, to be employed for an ink-jet printing operation corresponding to a kind of said reflex-type recording medium, out of said plural kinds of inks; and
   a printing controlling section to control said ink-jet printing operation, for which said combination of inks selected by said ink-combination selecting section is employed, based on said output image signals generated by said image-processing section.

8. The system of claim 1, wherein a spectral reflection factor of light, diffusedly reflected from said reflex-type recording medium in a wavelength range of 460 nm-640 nm, is at least 70%.

9. The system of claim 8, wherein said reflex-type recording medium comprises a substrate, which includes a white PET.

10. A system for recording a medical image on a recording medium, said system comprising:
   an image-processing section to apply at least one of a dynamic-range compression processing and a frequency enhancement processing to original image signals which represent said medical image and which are inputted into the image-processing section, in order to generate output image signals;
   an image-processing condition selecting section to select an image-processing condition, to be employed in the at least one of said dynamic-range compression processing and said frequency enhancement processing, out of plural image-processing conditions which are different from each other, corresponding to a type of said recording medium employed for recording said medical image; and
   an image-processing controlling section to control said image-processing section so as to perform an image-processing operation based on said image-processing condition selected by said image-processing condition selecting section.

11. The system of claim 10, wherein said recording medium includes a reflex-type recording medium; and
   wherein a spectral reflection factor of light, diffusedly reflected from said reflex-type recording medium in a wavelength range of 460 nm-640 nm, is at least 70%.

12. The system of claim 10, wherein, when said frequency enhancement processing is performed, said image-processing condition selecting section selects the image-processing condition such that a value of a first modulation transfer function, with respect to an image-processing at 2.0 cycles/mm for recording onto a reflex-type recording medium, is greater than a value of a second modulation transfer function, with respect to an image-processing at 2.0 cycles/mm for recording onto a transparenttype recording medium.

13. The system of claim 12, wherein said image-processing condition selecting section selects the image-processing condition such that the value of the first modulation transfer function is at least 1.5 times the value of the second modulation transfer function.

14. The system of claim 12, wherein said image-processing section performs said frequency enhancement processing based on an equation of, $$Sproc=Sorg+\beta(Sorg-Sus),$$

where Sproc represents the output image signals generated by said image-processing section, Sorg represents the original image signals inputted into said image-processing section, Sus represents unsharp image signals generated by applying an unsharp-mask processing to said original image signals, and $\beta$ represents an emphasizing coefficient; and
   wherein at least one of said emphasizing coefficient $\beta$ and a size of a mask, employed for said unsharp-mask processing when recording onto said reflex-type recording medium, is greater than that employed for said unsharp-mask processing when recording onto said transparent-type recording medium.

15. The system of claim 12, wherein said frequency enhancement processing comprises a multi-resolution image enhancement processing, which employs plural unsharp image signals that have different modulation transfer functions in regard to an unsharp image-processing.

16. The system of claim 12, wherein a transmission diffused density of said transparenttype recording medium is at most 0.4.

17. The system of claim 16, wherein said transparent-type recording medium comprises a substrate which comprises a transparent PET including a blue dye.

18. The system of claim 10, wherein, in said frequency enhancement processing when recording onto a reflex-type recording medium, an emphasizing degree of said frequency enhancement processing is increased as an image density is decreased.

19. The system of claim 18, wherein said image-processing section performs said frequency enhancement processing based on an equation of, $$Sproc=Sorg+\beta(Sorg-Sus),$$

where Sproc represents the output image signals generated by said image-processing section, Sorg represents the original image signals inputted into said image-processing section, Sus represents unsharp image signals generated by applying an unsharp-mask processing to said original image signals, and $\beta$ represents an emphasizing coefficient; and
   wherein at least one of said emphasizing coefficient $\beta$ and a size of a mask, employed for said unsharp-mask processing, monotonously decreases with an increase of said image density.

20. The system of claim 10, wherein, when said dynamic-range compression processing is performed, said image-processing condition selecting section selects the image-processing condition such that a compression degree when recording onto a reflex-type recording medium is higher than a compression degree when recording onto a transparenttype recording medium.

21. The system of claim 10, wherein, when said dynamic-range compression processing is performed, said image-processing condition selecting section selects the image-processing condition such that a compression degree in a high density range when recording onto a reflex-type recording medium is higher than when recording onto a transparenttype recording medium.

22. The system of claim 10, wherein, when said dynamic-range compression processing is performed, said image-processing condition selecting section selects the image-processing condition such that said dynamic-range compression processing is performed only in a low density range when recording onto a transparent-type recording medium, while said dynamic-range compression processing is performed in both said low density range and a high density range when recording onto a reflex-type recording medium.

23. The system of claim 10, further comprising: an ink-jet printer which comprises an ink-jetting head that emits ink particles from plural kinds of inks, densities of which are different relative to each other while colors of which are substantially the same, so as to form an output medical image on said recording medium, based on said output image signals generated by said image-processing section.

24. The system of claim 10, further comprising:
an ink-jet printer which comprises an ink-jetting head that emits ink particles from plural kinds of inks, densities of which are different relative to each other while colors of which are substantially the same;
an ink-combination selecting section to select a combination of inks, to be employed for an ink-jet printing operation corresponding to a type of said recording medium, out of said plural kinds of inks; and
a printing controlling section to control said ink-jet printing operation, for which said combination of inks selected by said ink-combination selecting section is employed, so that said ink-jet printer forms an output medical image on said recording medium, based on said output image signals generated by said image-processing section.

25. The system of claim 12, wherein said reflex-type recording medium comprises a substrate, which includes a white PET.

* * * * *